Figure 1:
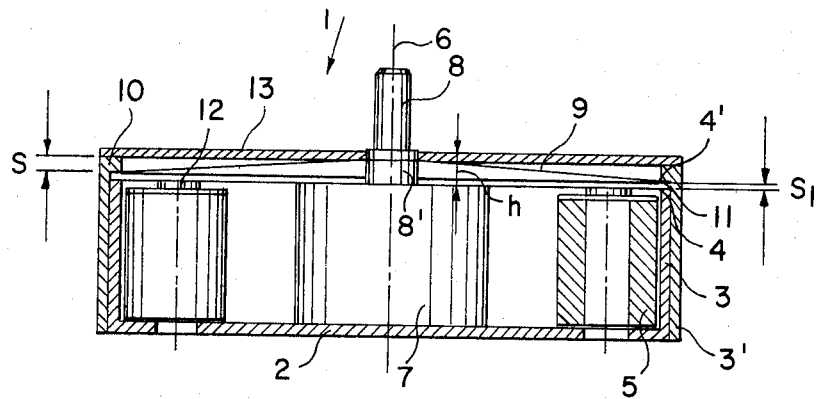

United States Patent

Neumann

[11] 4,081,702
[45] Mar. 28, 1978

[54] STEPPING MOTOR
[75] Inventor: Gerhard Neumann, Immenstaad, Germany
[73] Assignee: Dornier System GmbH., Germany
[21] Appl. No.: 656,269
[22] Filed: Feb. 9, 1976
[30] Foreign Application Priority Data
Apr. 23, 1975 Germany .......................... 2517974
[51] Int. Cl.² .......................................... H02K 37/00
[52] U.S. Cl. .................................. 310/49 R; 310/82; 310/83
[58] Field of Search .................. 310/49, 40 MM, 156, 310/268, 80, 162, 82, 163, 83, 23; 343/763, 766

[56] References Cited
U.S. PATENT DOCUMENTS

| 2,275,827 | 3/1942 | Plensler | 310/82 |
|---|---|---|---|
| 3,169,201 | 2/1965 | Spring | 310/83 |
| 3,169,202 | 2/1965 | Proctor | 310/83 |
| 3,262,081 | 7/1966 | Fairbanks | 310/82 |
| 3,474,272 | 10/1969 | Newell | 310/49 |
| 3,579,276 | 5/1971 | Newell | 310/83 |
| 3,585,426 | 6/1971 | Newell | 310/49 |
| 3,644,764 | 2/1972 | Newell | 310/49 |

OTHER PUBLICATIONS

Elektrischer Shritmotor Diwan; Hannover Messe; 1974; Electronik Fur Raumfahrt & Atomtechnik.

Primary Examiner—R. Skudy
Attorney, Agent, or Firm—James E. Bryan

[57] ABSTRACT

This invention relates to an improvement in a stepping motor, comprising a stator housing with electromagnets being annularly positioned therein, a flexible membrane rotatably mounted over said electromagnets on a bearing block shaft, said shaft being axially positioned within the stator housing, said membrane being a magnetically-conducting annular disc, adapted to act as a rotor, the improvement comprising race means whereby the membrane is prestressed on the side facing away from the electromagnets by pressing and its conically deformed by an amount coordinated to the step size and holding moment of the stepping motor, and including contact surface means corresponding with the race means on the one hand, and with the stator housing on the other hand, said surface means being equivalent at the upper side and the underside of the membrane.

3 Claims, 3 Drawing Figures

U.S. Patent  March 28, 1978  4,081,702

STEPPING MOTOR

The present invention relates to a stepping motor composed of a known stator housing having electromagnets being annularly mounted therein with, for example, conically flattened pole shoes, an also known flexible membrane rotatably positioned thereover on a bearing block shaft, the latter being axially mounted within the stator housing. The membrane serves as a rotor with a magnetically-conducting annular disc peripherally arranged therein.

Such stepping motors are known in actual practice for use in aeronautics and astronautics, in small precision engineering, and for other requirements that necessitate a high degree of angular resolution for precision displacements. Typical fields of application are the positioning of antennas, gyroscope systems, and adjusting or setting mechanisms. A particular example is the step-by-step displacement of a satellite regulator wheel whereby an angular displacement is effected between the twisting wheel and the satellite.

Known in the art is, for example, an electric stepping motor developed by the firm Kleinwaechter, of Loerrach, for extremely small angular steps which is composed of a number of electromagnets annularly mounted within a stator housing and a flexible membrane rotatably positioned thereover, with small iron plates at the periphery. By connecting and disconnecting the electromagnets or coils in a corresponding sequence, a circulating electromagnetic wave is produced, and the magnetic flux depends upon the coil current, the length of the air gaps, and the material used therefor. During operation, six coils or electromagnets are continuously energized simultaneously, and in each case three adjacent ones and those being positioned diametrically with respect thereto. The magnetic flux acting upon the small iron plates at the periphery of the membrane, and the forces resulting therefrom have the effect that the flexible membrane comes to rest against the surfaces of the conically flattened pole shoes of the electromagnets. By step-by-step excitation of the nearest adjacent coils and the simultaneous disconnection of those coils which were last excited in the row, the membrane is caused to rotate, at which time it will execute a kind of rolling movement via the pole shoe surfaces. The tapping of the torsional moment takes place at the axis of rotation of the membrane.

All such stepping motors known to date have the common disadvantage that, in the currentless or unenergized condition thereof, they have no holding moment and operate with only relatively low frequencies. Furthermore, these stepping motors attain a small angular or step resolution only at relatively large diameters.

It is the object of the present invention to provide a stepping motor in such a way that in the currentless or unenergized condition thereof it has a holding moment which is transmitted free from play onto the driven shaft, and at the same time an angular or step resolution is possible at a small diameter. Moreover, it is intended that the stepping motor be adapted to operate at a frequency of approximately 600 Hz in order to make possible a rapid positioning and to assure a change-over free from play. Additionally, it should be rendered possible by a simple variant of the stepping motor to attain — in case of the loss of the fine-step resolution — a reproducible or slipping-free angular or step resolution.

This object is obtained in accordance with the present invention, by virtue of the fact that, by the counterpressure of a race, the membrane is prestressed on the side facing away from the electromagnets and is conically deformed by an amount coordinated to the stepping amount and the holding moment of the stepping motor, whereby integrated contact surfaces correspond with the race, on the one hand, and with the stator housing or the circumferential wall thereof, on the other hand, with race surfaces equivalent at the upper side and the underside of the membrane.

A further embodiment of the present invention provides that positioned at the periphery of the membrane on the side facing away from the electromagnets is a toothed rim which corresponds with a toothed rim at the periphery of the race, whereby either the lower toothed rim postioned at the membrane, or the upper toothed rim positioned at the race has Z number of teeth, and the corresponding toothed rim has at least the number of teeth $Z \pm 2$.

The advantages obtainable with the present invention are particularly that the stepping motor in one construction is conically deformed or pulled in the direction of the electromagnets by the pressing against each other of the two peripheral contact surfaces of the race and the membrane. The frictional moment between the two contact surfaces or zones of contact resulting from the prestress of the membrane thus produced yields the holding moment when the electromagnets are not energized or when the stepping motor is in the position of rest thereof. When the electromagnets are energized, the partial surfaces of the membrane positioned opposite thereto are in each case attracted. As a result thereof, the membrane will be linearly in contact with the running edge or the rolling surface of the race only in a position offset about 90° to the resultant of the magnetic forces emanating from the coils thereof. When the rotating field is further advanced cyclically, this bilateral contact point rotates in the same manner. Due to the conical prestress of the membrane, on the one hand, and the diametrical contact of the two slip planes with the coils or the electromagnets energized, on the other hand, there results a diameter different from the rolling surface for the rolling-off of the membrane, whereby the step is produced. When the coils are disconnected, the prestressed membrane or the entire surface of the periphery thereof folds or places itself relatively firmly against the rolling surface of the race. As a result, the circulation of the membrane is immediately blocked. By virtue of the instantaneously-acting holding moment, an angular step resolution of approximately 0.01° and smaller is achieved with a cyclical connection of the coils. In addition thereto there exists a relatively high holding moment in the condition of rest of the membrane, i.e. without energization of the coils. Furthermore, the simple, space-saving, symmetrical construction and the small number of structural elements impart to the stepping motor a high reliability with respect to accuracy, stability to temperature changes, and vibration resistance.

According to another embodiment of this stepping motor, a toothed rim is positioned at the periphery of the membrane and corresponds to a toothed rim arranged opposite thereto at the periphery of the race. Both of these toothed rims differ from each other with respect to the number of teeth thereof, and one of them has the number of teeth Z, while the other has a number of teeth of at least $Z \pm 2$. In this embodiment, the stepping motor operates in principle in the same manner as the one first described herein. Here again, it is the conical deformation, the prestress of the membrane, and the gear-tooth system that bring about a relatively high holding moment in the condition of rest of the membrane without additional permanent magnets. Furthermore, reproducibility is assured in this embodiment.

The cabling and control are such that two diametrical coils or electromagnets are always connected with each other to one phase and are controlled according to the cycle positioned thereabove. This means that two adjacent and oppositely-positioned coils or eletromagnets are energized at the same time.

Both embodiments of the novel stepping motor have a relatively low torsional moment, whereby the cut-off frequency is approximately at 600 Hz as the stepping frequency (in comparison therewith, conventional stepping motors of this type, for example the Kleinwaechter stepping motor, have approximately 50 Hz). The steps are executed without any overshoot up to the highest frequencies. The direct reversal of the direction of rotation is precise to the step, whereby the start-stop operation is controlled equally precisely up to that frequency. Also, in these two embodiments of stepping motors, a vacuum-stable construction is relatively easy to manufacture.

Figure 2:
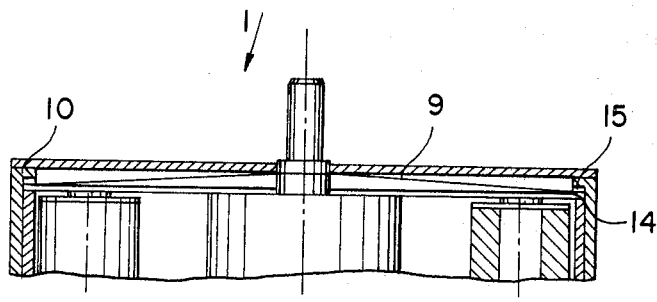
Figure 3:
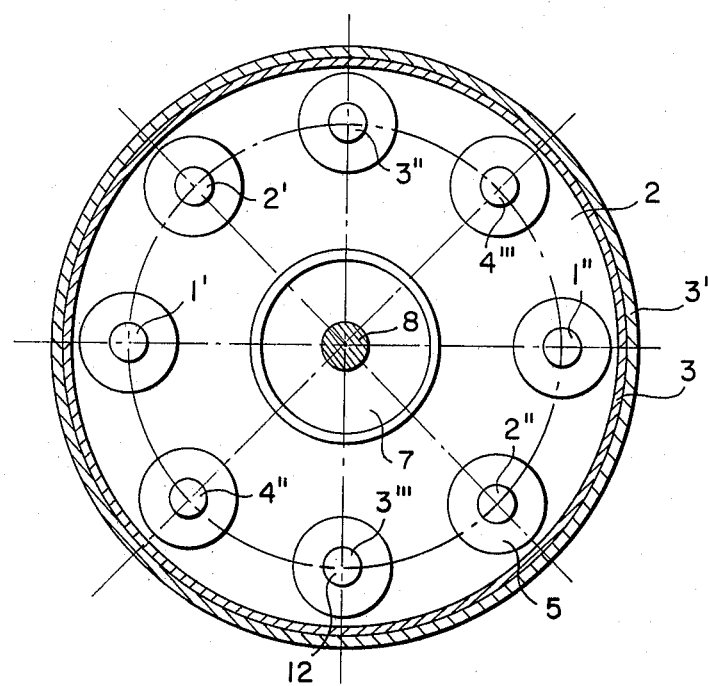

Embodiments of the present invention will now be described in further detail hereinafter and are illustrated in the accompanying drawings, wherein FIG. 1 illustrates a stepping motor in cross-section and in a side view thereof with a conically deformed membrane and a counter-pressed race without a gear-tooth system;

FIG. 2 illustrates a stepping motor according to FIG. 1, but with a gear-tooth system, and FIG. 3 illustrates the stepping motor, or the stator housing thereof according to FIGS. 1 and 2, in a top plan view without a cover and membrane.

The embodiment of a non-geared stepping motor 1 illustrated in FIG. 1 in cross-section and in a side view is composed of a cylindrical pot-like stator housing 2 of a magnetically-conducting material, which housing has a surface 4 on the peripheral wall 3 thereof at the end face thereof. Annularly positioned within the peripheral wall 3 are the peripheral coils or electromagnets 5. Arranged in the axis 6 of the stator housing 2 and rigidly connected therewith is a bearing block 7 (containing, for example, a "duplex" precision bearing) which is at the same time the carrier of a driven shaft 8 rotatably positioned therein. Mounted above the bearing block 7 is a flexible, magnetically-conducting membrane 9 rigidly connected with the driven shaft 8 or with a collar 8' arranged thereat. The peripheral wall 3 is enclosed by a second peripheral wall 3' which, on the side facing the end side of the peripheral wall 3 forms a race 10. This embodiment is made in such a way that the race 10 extends in a flange-like manner over the rolling surface 4 of the peripheral wall 3 and forms therewith an annular groove 11 which is delimited at the bottom thereof by the surface 4 and at the top thereof by the end face of the race 10 acting as a rolling surface 4'. The annular groove 11 receives the periphery of the membrane 9 whereby the membrane is prestressed and conically deformed by lying or pressing against the rolling surface 4' of the race 10. The extent of the prestress and the deformation S depends in this case upon the step size required and the coordinated holding moment and may be varied (with a predetermined diameter of the stepping motor) by a corresponding selection of the collar height $h$ of the collar 8' mounted on the driven shaft 8. The gap $S_1$ remaining between the surface 4 and the peripheral surface of the membrane 9 positioned thereover constitutes the play, required during the energization of the coils or electromagnets 5, for the diametrical linear and step-by-step displacement of the membrane 9 cyclically attracted thereby and being caused to rotate by the circulating magnetic wave being thereby produced. At that time the membrane is linearly diametrically in contact with the rolling surface 4' now only in a position offset by 90° to the resultant of the magnetic forces emanating from the coils or the electromagnets 5. Together with the cyclic further advancement of the rotating field, also circulates this bilateral contact point. The step is produced by the conical deformation or the prestress of the membrane 9 which, during rolling-off, has a diameter different from the rolling surface 4'. When the electromagnets 5 are disconnected or when the coils thereof are not energized, the prestressed membrane 9 is positioned with its peripheral surface relatively firmly against the rolling surface 4' of the race 10 and brings about, due to the frictional moment existing between the rolling surface 4' or the holding moment resulting therefrom, an immediate stoppage or an instantaneous blocking of the step-by-step rotation of the membrane 9. Neither in the condition of rest nor during the step-by-step rotation of the membrane 9 will the poles 12 of the electromagnets 5 to be contacted by it. The stator housing 2 is covered, together with the membrane 9, against outside influences by a cover 13 penetrated by the driven shaft 8 and the collar 8'.

FIG. 2 illustrates an embodiment of a toothed stepping motor 1 according to FIG. 1 in a side view thereof. The construction and hence the description is the same, in principle, as that of FIG. 1. The difference between FIGS. 1 and 2 is merely that the peripheral surface of the membrane 9 facing the rolling surface 4' of the race 10 is the carrier of a toothed rim 14 which corresponds to a toothed rim 15 mounted on the rolling surface 4'. Both toothed rims 14, 15 differ from each other by the number of their teeth Z, and either the lower or the upper toothed rim 14 or 15 has the number of teeth Z while the respectively corresponding toothed rim has at least the number of teeth Z ± 2. A relatively high holding moment is obtained also in this embodiment by virtue of the conical deformation, and the prestress of the membrane 9 obtained thereby during its condition of rest, without there being any need for the provision of additional permanent magnets.

Illustrated in FIG. 3 is the stepping motor 1, shown in a side view in FIGS. 1 and 2, in a top plan view without a cover 13 or membrane 9 (FIGS. 1 and 2). In this figure, reference numeral 3 identifies the peripheral wall of the stator housing 2; reference numeral 3' designates the second peripheral wall connected with the race 10 (FIGS. 1 and 2); reference numeral 5 designates the electromagnets or coils; reference numeral 12 designates the poles thereof; reference numeral 7 designates the bearing block, and reference numeral 8 designates the driven shaft. The cabling of the coils 5 is made in such a manner that two coils or electromagnets 5 in each case positioned opposite each other about 180° are electrically connected with each other (see 1'-1", 2'-2", 3"-3"', 4"-4"'.)

It will be obvious to those skilled in the art that many modifications may be made within the scope of the present invention without departing from the spirit thereof, and the invention includes all such modifications.

What is claimed is:

1. In a stepping motor, comprising a stator housing with electromagnets being annularly positioned therein, a flexible membrane mounted over said electromagnets on a bearing block shaft, said shaft being axially positioned within the stator housing, and said membrane being a magnetically-conducting annular disc, the improvement comprising race means formed as an annular groove between a first peripheral wall of said stator housing and a second peripheral wall abutting and surrounding said first peripheral wall of said stator housing, whereby the membrane is prestressed on the side facing away from the electromagnets by pressing and is conically deformed by an amount coordinated to the step size and holding moment of the stepping motor, and including contact surface means on said membrane corresponding with the top of the annular groove on the one hand, and with the bottom of the annular groove on the other hand, said surface means being equivalent at the upper side and the underside of the membrane.

2. A stepping motor according to claim 1 including first toothed rim means at the periphery of the membrane on the side facing away from the electromagnets which rim means corresponds with a second toothed rim means at the periphery of the race means, one of said first and second toothed rim means having a number of teeth Z, and the other toothed rim having a number of teeth $Z \pm 2$.

3. A stepping motor according to claim 1 including conically flattened pole shoes on said electromagnets.

* * * * *